(12) United States Patent
Van Zyl et al.

(10) Patent No.: US 9,156,520 B2
(45) Date of Patent: Oct. 13, 2015

(54) CONTROL ASSEMBLY FOR A BICYCLE SHOCK ABSORBER

(71) Applicant: SRAM, LLC, Chicago, IL (US)

(72) Inventors: Michael Van Zyl, Colorado Springs, CO (US); Andrew Shawver, Colorado Springs, CO (US)

(73) Assignee: SRAM, LLC, Chicago, IL (US)

( * ) Notice: Subject to any disclaimer, the term of this patent is extended or adjusted under 35 U.S.C. 154(b) by 99 days.

(21) Appl. No.: 13/960,483

(22) Filed: Aug. 6, 2013

(65) Prior Publication Data

US 2015/0041267 A1 Feb. 12, 2015

(51) Int. Cl.
| | |
|---|---|
| *F16F 9/34* | (2006.01) |
| *B62K 25/04* | (2006.01) |
| *B62K 23/02* | (2006.01) |
| *F16F 9/46* | (2006.01) |
| *F16F 9/44* | (2006.01) |

(52) U.S. Cl.
CPC ............... *B62K 25/04* (2013.01); *B62K 23/02* (2013.01); *F16F 9/461* (2013.01); *B62K 2025/047* (2013.01); *B62K 2025/048* (2013.01); *F16F 9/443* (2013.01)

(58) Field of Classification Search
CPC ............. F16F 9/44; F16F 9/443; B60G 17/02
USPC .................. 188/282.1, 299.1, 313, 319.1; 280/5.503, 5.504, 5.514, 5.515
See application file for complete search history.

(56) References Cited

U.S. PATENT DOCUMENTS

| | | | |
|---|---|---|---|
| 5,275,264 A * | 1/1994 | Isella ................. | 188/299.1 |
| 5,522,483 A * | 6/1996 | Koch .................. | 188/282.2 |
| 5,592,999 A * | 1/1997 | Matsuura et al. ....... | 180/227 |
| 6,382,370 B1 * | 5/2002 | Girvin ................. | 188/299.1 |
| 2010/0059964 A1 | 3/2010 | Morris | |
| 2012/0235332 A1 | 9/2012 | Jordan | |
| 2013/0105260 A1* | 5/2013 | Chen et al. ........... | 188/313 |

* cited by examiner

*Primary Examiner* — Christopher Schwartz
(74) *Attorney, Agent, or Firm* — Milan Milosevic; Lisa Serdynski

(57) ABSTRACT

A control assembly for controlling a component, such as a bicycle shock absorber including a first actuator carried by the shock absorber. The first actuator has a fulcrum body supported in the shock absorber and a control arm displacing the fulcrum body. The first actuator pivots on the fulcrum body to operatively control a first characteristic of the shock absorber.

29 Claims, 11 Drawing Sheets

CONTROL ASSEMBLY FOR A BICYCLE SHOCK ABSORBER

BACKGROUND OF THE INVENTION

The invention relates to bicycle components, such as suspension systems and in one example, to a control assembly of a rear shock absorber/damper of a bicycle suspension system that is operated to control characteristics of the suspension system.

Bicycle components such as shock absorbers can have a variety of operational characteristics, some of which may be adjustable. Examples of characteristics that may be adjustable include rebound damping and compression damping or lockout. Prior art control assemblies for controlling these characteristics may include a first rotatable mechanism operable between at least two rider-selectable positions to control a first characteristic of the suspension such as lockout and a second rotatable mechanism for adjusting a second characteristic of the suspension system such as rebound damping.

Typically, a shock absorber includes a piston disposed in a cylinder for reciprocation therein. The piston is attached to a piston shaft for reciprocation within the cylinder. The piston divides the cylinder into two opposed chambers. A fluid, such as oil, or air, or the like, is normally contained in the chambers. In use, the fluid passes between the chambers through passageways and/or valves in or associated with the piston to create damping of the suspension system.

The damping characteristics of the suspension system can affect the quality of performance provided for a given application. Damping settings may be desired to be different according to a number of various factors such as rider weight, rider skill, terrain conditions, etc., and the configuration of the suspension system. It is desirable to provide a suspension system wherein the damping characteristics are adjustable. Further, it is advantageous to provide shock absorbers that are externally adjustable by the rider, and in particular, it is often advantageous to adjust the suspension during use.

One design for a damping adjuster uses an adjuster rod that extends down the center of the piston shaft to engage and operate the piston assembly, which may include a valve mechanism or structure that performs the function of valve (s). Adjustment is commonly made in either of two ways, the adjuster rod is moved axially (up or down) to alter damping or the adjuster rod is rotated to alter damping. For example, one prior art arrangement involves a rotatable, cylindrical cam, wherein the cam engages the adjuster rod to vary the axial position of the rod. A certain amount of effort is required to rotate the cam both due to friction generated during actuation of the cam mechanism and fluid pressure on the structure being operated upon by the rod. It would be desirable to reduce the effort required for adjustments to be performed with the adjuster rod, whether manually, by some sort of remote actuator or by a motorized mechanism.

There is a need to provide a simple, reliable and low-effort mechanism to control the various functions of a suspension system. The invention satisfies the need.

BRIEF SUMMARY OF THE INVENTION

The invention provides a control assembly for adjusting the damping of a suspension system, for example, that allows the rider to customize the characteristics of the system to suit the terrain or the rider's particular riding style. The invention provides a control assembly that operates with relatively low effort.

One aspect of the invention is a control assembly for controlling a bicycle component, such as a front or rear shock absorber, including a first actuator carried by the component. The first actuator has a fulcrum body supported in the component and a control arm displacing the fulcrum body. The first actuator pivots on the fulcrum body to operatively control a first characteristic of the component.

Other aspects of the invention include wherein the fulcrum body may be spheroidal or spherical. The fulcrum body may be a one-piece construction with the control arm. The fulcrum body and control arm may be separate. The fulcrum body may be in the form of an eyelet. The first actuator may have an exterior portion that extends from the fulcrum body to a point outside of a housing part of the shock absorber. The first actuator may have an interior portion that extends from the fulcrum body to a driver, wherein the driver is operative to control compression damping in the shock absorber. The interior portion may be of a lesser length than the exterior portion. The shock absorber includes a piston assembly and the driver may be moved axially to effect changes in fluid flow through the piston assembly. The shock absorber has a housing which may define a seat shaped and sized to retain the fulcrum body. The first actuator may control compression damping. The compression damping may be switchable from a lockout to an open (non-lockout) setting by the first actuator. The control arm may be configured to move in a plane that passes through the axis of the shock absorber.

The control assembly may further include a second actuator displaceable in a housing of the shock absorber, the second actuator including a hollow interior shaped and sized to retain the fulcrum body of the first actuator and operative to control a second characteristic of the shock absorber. The second actuator may be configured to be rotatably displaceable. The hollow interior may be shaped to pivotally retain the second actuator. The second actuator may control rebound damping. The second actuator may include a cylindrical portion that defines the hollow interior. The control assembly may further include a sleeve that is sized and shaped to fit within the hollow interior to define a seat for the fulcrum body with the cylindrical portion. The fulcrum body may be spheroidal or spherical. The fulcrum body may be a one-piece construction with the control arm. The fulcrum body and control arm may be separate. The fulcrum body may be in the form of an eyelet. The first actuator may have an exterior portion that extends from the fulcrum body to a point outside of a housing part of the shock absorber. The first actuator may have an interior portion that extends from the fulcrum body to a driver, the driver operative to control compression damping in the shock absorber. The interior portion may be of a lesser length than the exterior portion.

These and other features and advantages of the invention will be more fully understood from the following description of one or more embodiments of the invention, taken together with the accompanying drawings.

DETAILED DESCRIPTION OF THE INVENTION

Figure 1:
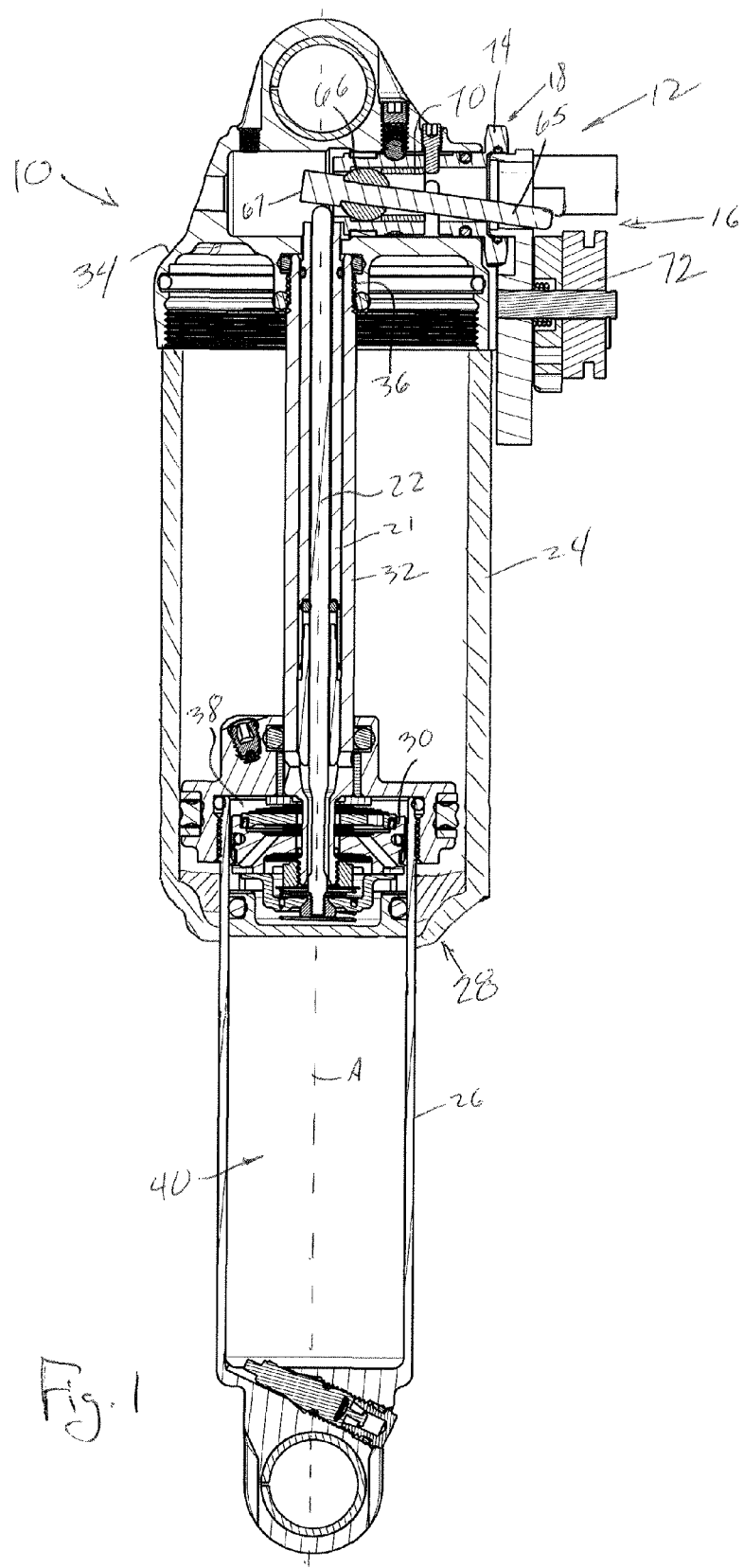
FIG. 1 is a cross-section of a rear shock absorber.
Figure 2:
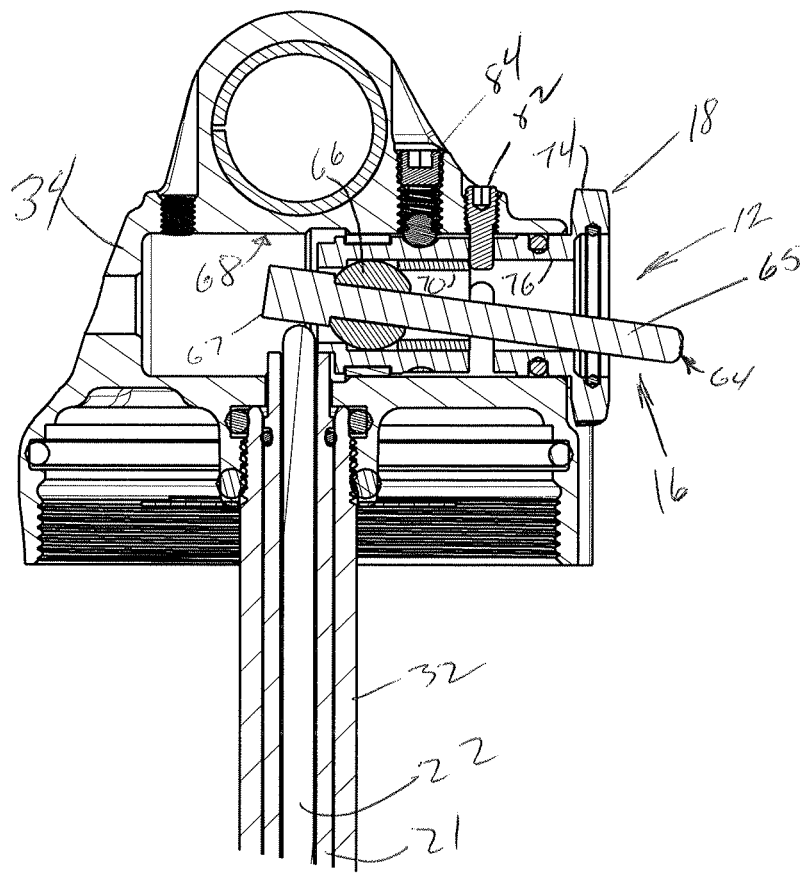
FIG. 2 is a cross-section of an upper portion of the rear shock absorber including a control assembly.

Embodiments of the invention will herein be described with reference to the drawings. It will be understood that the drawings and descriptions set out herein are provided for illustration of examples of the invention and do not limit the invention as defined by the claims appended hereto and any and all their equivalents. For example, the terms "first" and "second," "above" and "below," or "left" and "right," for example, are used to clearly set out the elements of the invention as shown and not as terms of limitation. Moreover, the terms refer to bicycle mechanisms conventionally mounted to a bicycle and with the bicycle oriented and used in a standard fashion unless otherwise indicated.

FIGS. 1-13 illustrate a bicycle component such as a suspension component or part 10, comprising a rear shock absorber or "shock," having a control assembly 12 to adjust the operation of the shock absorber. It will be understood that other components may benefit from the actuator detailed herein such as a front shock absorber or a suspension seat post, for example. The control assembly 12 generally includes a first actuator 16, which is operable between at least two rider-selectable positions to control or adjust a first characteristic or function of the shock absorber 10 and an optional second actuator 18 to control or adjust a second characteristic or function of the shock absorber.

In this embodiment, the first actuator 16 controls or adjusts a first suspension characteristic such as, for example, compression damping, to produce open and lockout states of the suspension system 10 and alternatively, may also provide intermediate compression damping states to produce a range of selectable damping settings.

The second actuator 18 controls or adjusts a second suspension characteristic different from the first; for example, rebound damping of the suspension system 10. Damping is viscous friction. Thus, the actuating devices 16, 18 may cause changes in the operation of the shock absorber to alter the amount of fluid friction produced by the shock absorber during compression and rebound activity.

The first actuator 16 includes a control arm 64 that is generally lever-shaped and a fulcrum part or body 66 functionally associated with, attached to or formed unitary with the control arm or formed separate therefrom. The fulcrum 66 supports the control arm 64 and permits the control arm to pivot. The control arm 64 is movable to occupy at least two selectable positions. The positions can be rider-selectable or selected by an automatic mechanism (not shown).

The at least two positions of the first actuator 16 may produce an "open" state and a "lockout" state. To produce these states, the first actuator 16 may act upon a piston assembly 28, which will be discussed hereinbelow.

Generally, the open state of the system 10 provides for a relatively unimpeded flow of fluid through the piston assembly 28 wherein the shock absorber compresses relatively easily and is responsive to forces generated by movement of the bicycle. The lockout state provides a relatively high resistance of fluid flow through the piston assembly 28 wherein the shock absorber 10 is relatively rigid or inactive.

A driver 22, which may also be referred to as a lockout control rod, is moved by the first actuator 16 to produce movement of the driver along axis A to switch between various suspension settings related to compression characteristics of the suspension system 10.

The control arm 64 may include an exterior portion 65 extending from the fulcrum part 66 to the outside of a distal end 34 of a first cylinder 24 of the suspension system 10 and an interior portion 67 that extends from the fulcrum part inwardly to contact the driver 22. The distal end 34 may be considered a housing or housing part of the first cylinder 24.

As noted above, the first actuator 16 may be positioned in two positions respectively representing open or lockout states or, for example, three or more rider-selectable positions representing open, lockout and one or more adjustable intermediate setting. For example, when the exterior portion 65 of control arm 64 of the first actuator 16 is moved to the position shown in FIG. 3, the interior portion 67 contacts the driver 22 with the effect of moving the driver axially downwardly. In the device shown in FIGS. 1 and 11, the position of the first actuator 16 and driver 22 of FIG. 3 may produce the open state. When the control arm 64 of the first actuator 16 is positioned as shown in FIG. 4, the interior portion 67 permits the driver 22 to move axially relatively upwardly. In the device shown in FIGS. 1 and 11 the position of the first actuator 16 and driver 22 of FIG. 4 may produce the lockout state. Also, positions of the first actuator 16 and driver 22 between fully up or fully down may produce compression damping states that are intermediate to the fully open or fully locked states.

Figure 3:
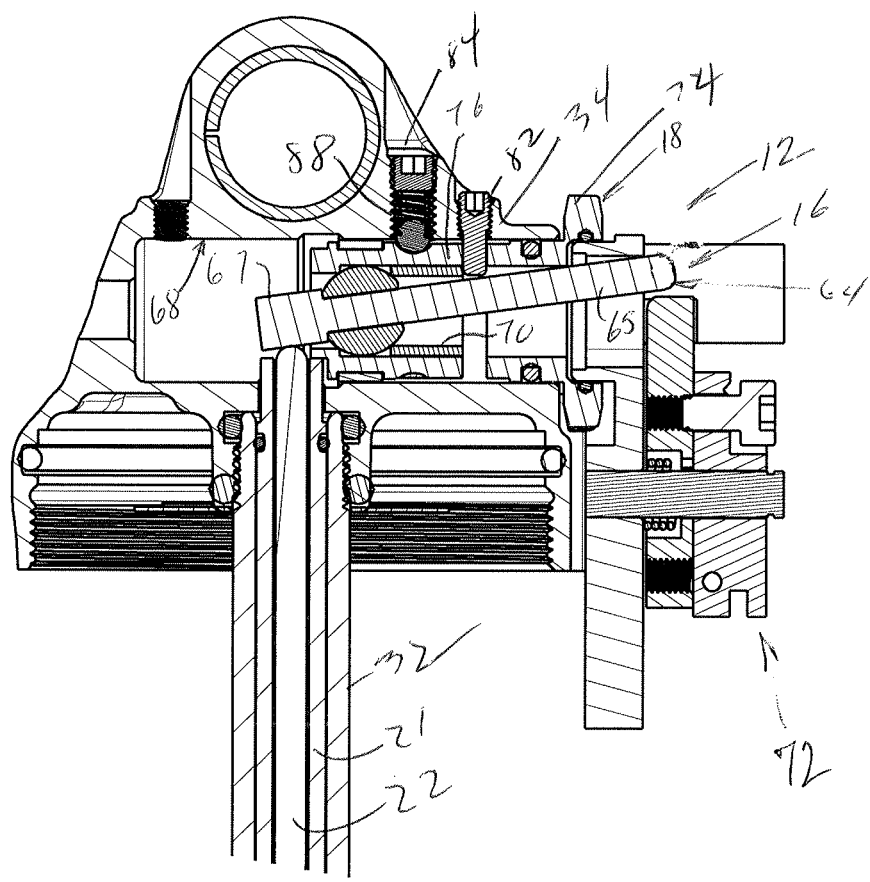
FIG. 3 is a cross-section of a control assembly of the rear shock absorber with a first actuator thereof in a first position.
Figure 4:
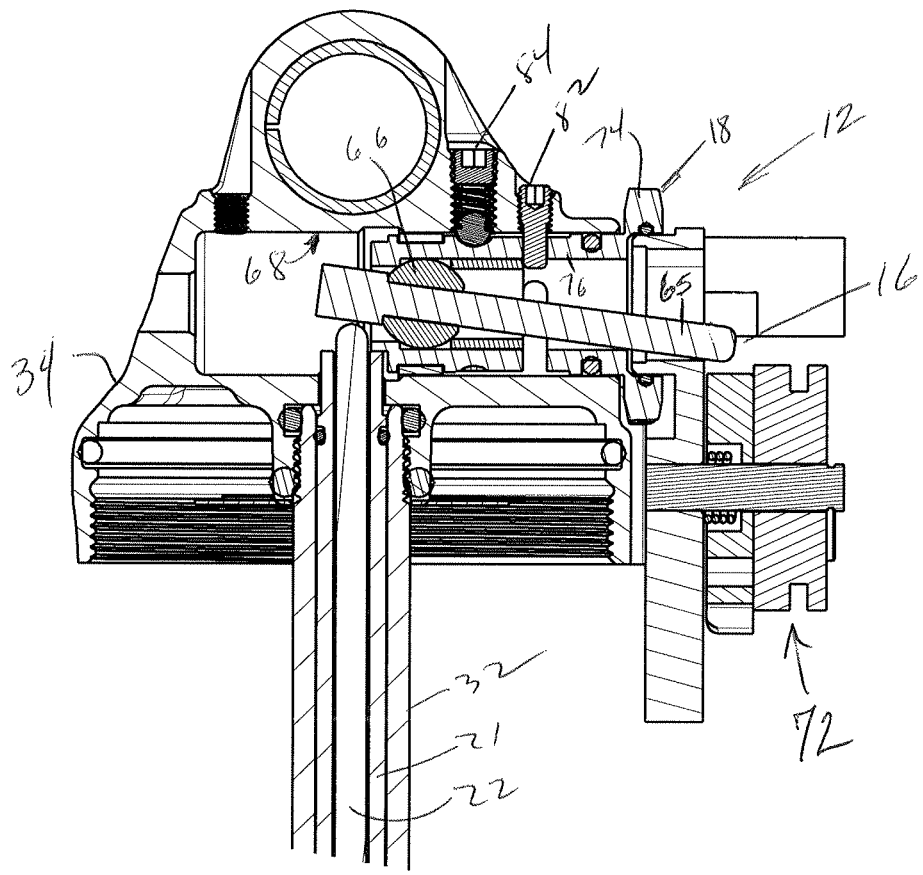
FIG. 4 is a cross-section of a control assembly of the rear shock absorber with the first actuator in a second position.
Figure 5:
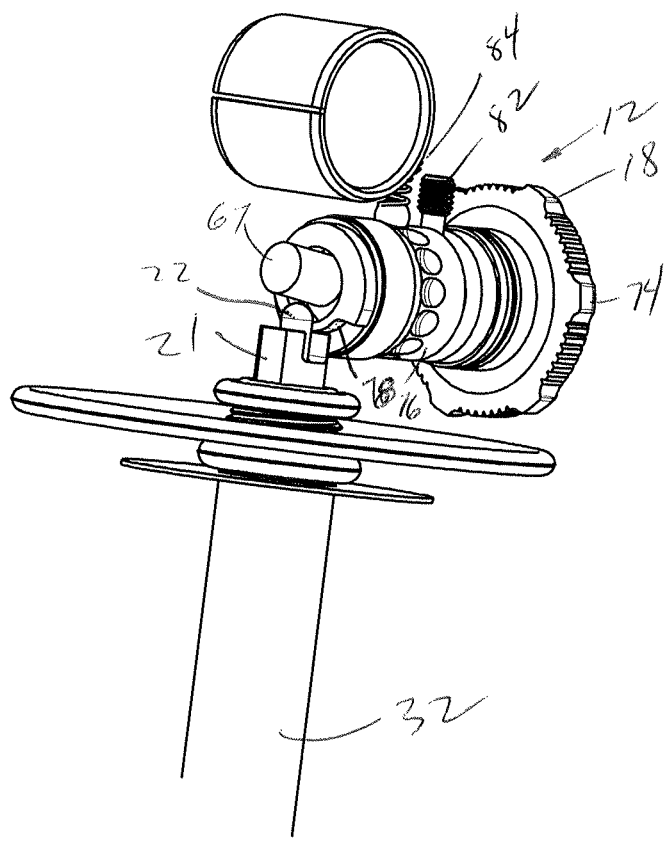
FIG. 5 is a first perspective view of the control assembly with some parts of the shock absorber omitted.
Figure 6:
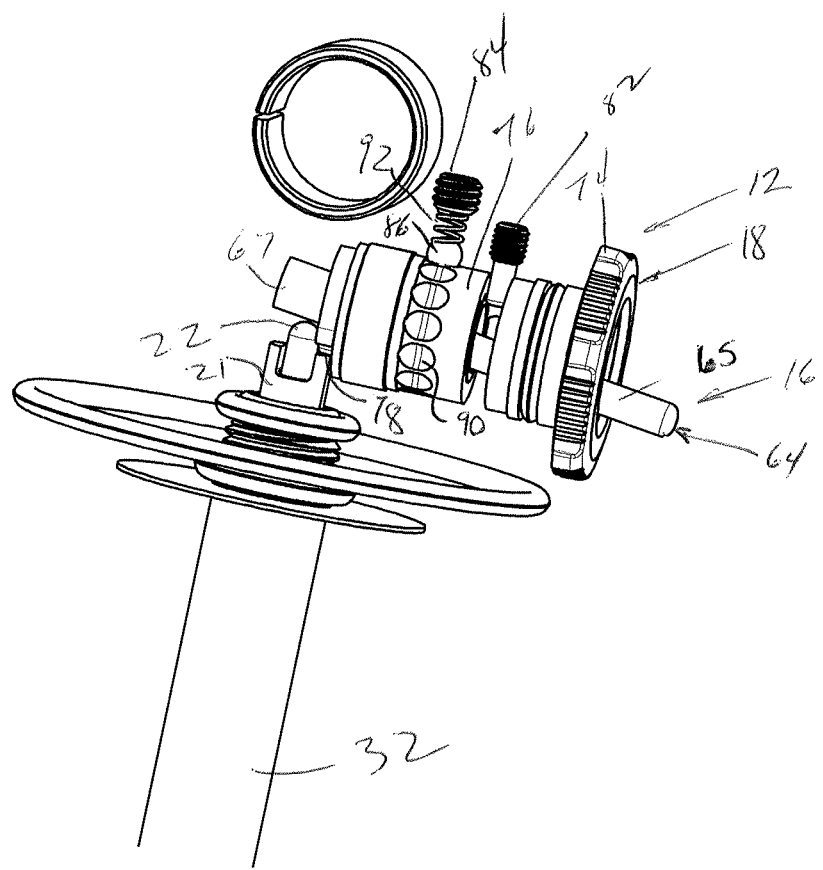
FIG. 6 is a second perspective view of the control assembly.
Figure 7:
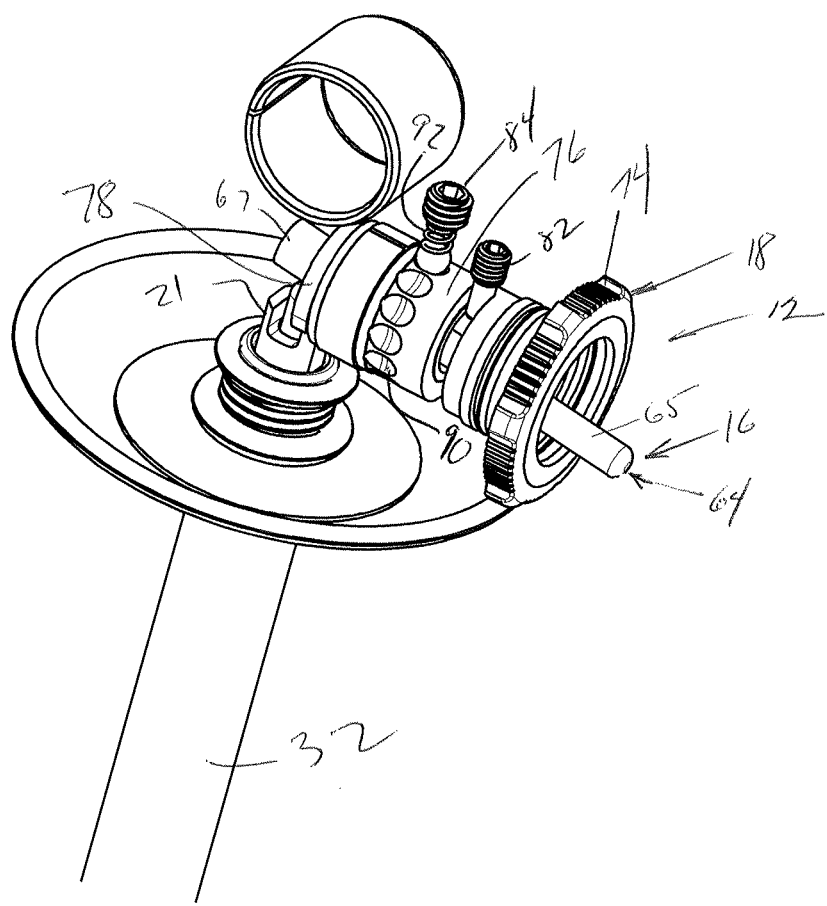
FIG. 7 is a third perspective view of the control assembly.

The control arm 64 may be positioned manually by hand or, as shown in FIGS. 3 and 4, by an actuator 72 operated by cable or a hydraulically-operated actuator (not shown). Optionally, the actuator 72 may be motor-operated (not shown).

Figure 8:
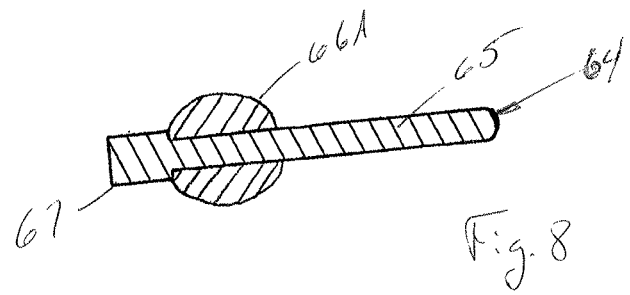
FIGS. 8-10 are cross-sections of a lever and fulcrum portion of the first actuator of the control assembly according to various embodiments.
Figure 9:
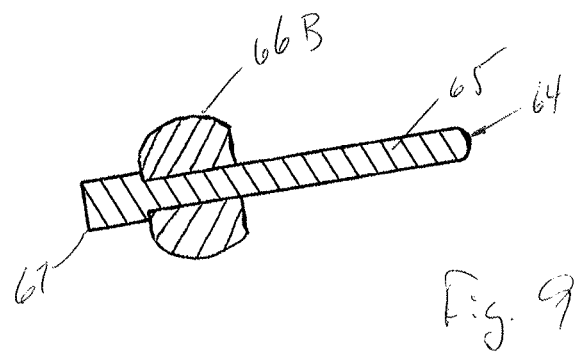
Figure 10:
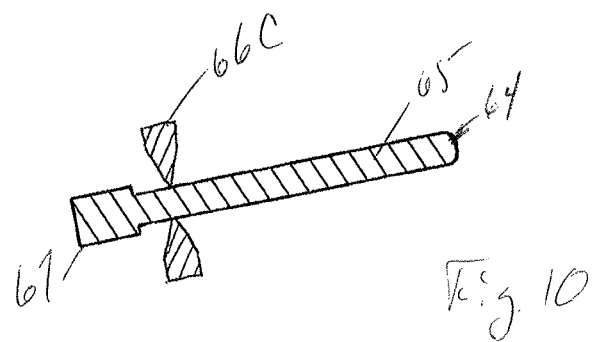

The fulcrum 66 may be any of a variety of generally rounded shapes such as spheroidal, spherical, elliptical, and truncated spheroidal, for example, some of which are shown in FIGS. 8-10. Essentially, the shape of the fulcrum 66 supplies the rounded part of a ball joint or a similar pivoting configuration or, in the alternative, pivotally supports the control arm 64.

The suspension system 10 may include an optional second actuator 18, which is rotatably disposed in aperture or bore 68 of the distal end 34. The second actuator 18 may be a generally cylindrical hollow shape with an outer end 74 located at or near the outside of the distal end 34. The outer end 74 may be shaped and sized to be manually graspable and manipulatable. The second actuator 18 includes a generally cylindrical hollow portion 76 extending inwardly from the outer end 74 and disposed within the bore 68. The cylindrical body 76 is sized and shaped to receive the fulcrum part 66 and a sleeve 70. The sleeve 70 positions and retains the fulcrum part 66 within the hollow body 76 and may be considered to form a seat within the hollow body. The sleeve 70 essentially fixes the position of the fulcrum 66 within the cylindrical body 76 while permitting it to freely swivel/pivot therein.

The cylindrical body 76 includes a cam feature or face 78 at an inner end thereof that is positioned and shaped to interact with the rebound adjust rod 21. When rotated, the cam feature 78 alters the position of the rod 21 within the main shaft 32 along axis A. The second actuator 18 adjusts characteristics of the suspension system 10, such as the rebound damping or other aspects of the system.

The remainder of the suspension system 10 takes a well-known form and it will be understood that any arrangement of shock absorber elements that would be operable with the present control assembly 12 according to the invention is contemplated. To illustrate, one such example will be set out generally herein. The suspension system 10 generally includes first and second cylinders 24, 26 displaceable relative to each other during compression (shortening) and rebound (lengthening) strokes of the suspension system. The suspension system 10 encloses a piston assembly 28 including a piston 30, which is slidably mounted in the second cylinder 26, and a hollow piston rod or main shaft 32 extending between and connected to the piston 30 at one end and a distal end 34 of the first cylinder 24 at the opposite end. The piston rod 32 is rigidly connected to the distal end 34 of the first cylinder 24 by a threaded engagement 36 or any suitable connection. The piston rod 32 houses the rebound adjust rod 21 and driver 22 respectively concentrically therein.

The piston 30 divides the second cylinder 26 into first and second fluid chambers 38, 40. The piston 30 has fluid passageways formed therethrough including one or more compression port 48, for allowing fluid to pass between the two fluid chambers 38, 40 in response to reciprocation of the piston 30 in the second cylinder 26 to affect damping. Not all of the passageways are illustrated herein; however, the piston assembly 28 and general configuration of the instant suspension system are the same as or similar to known rear shock absorber configurations, e.g., the Rock Shox Monarch RL™.

Figure 11:
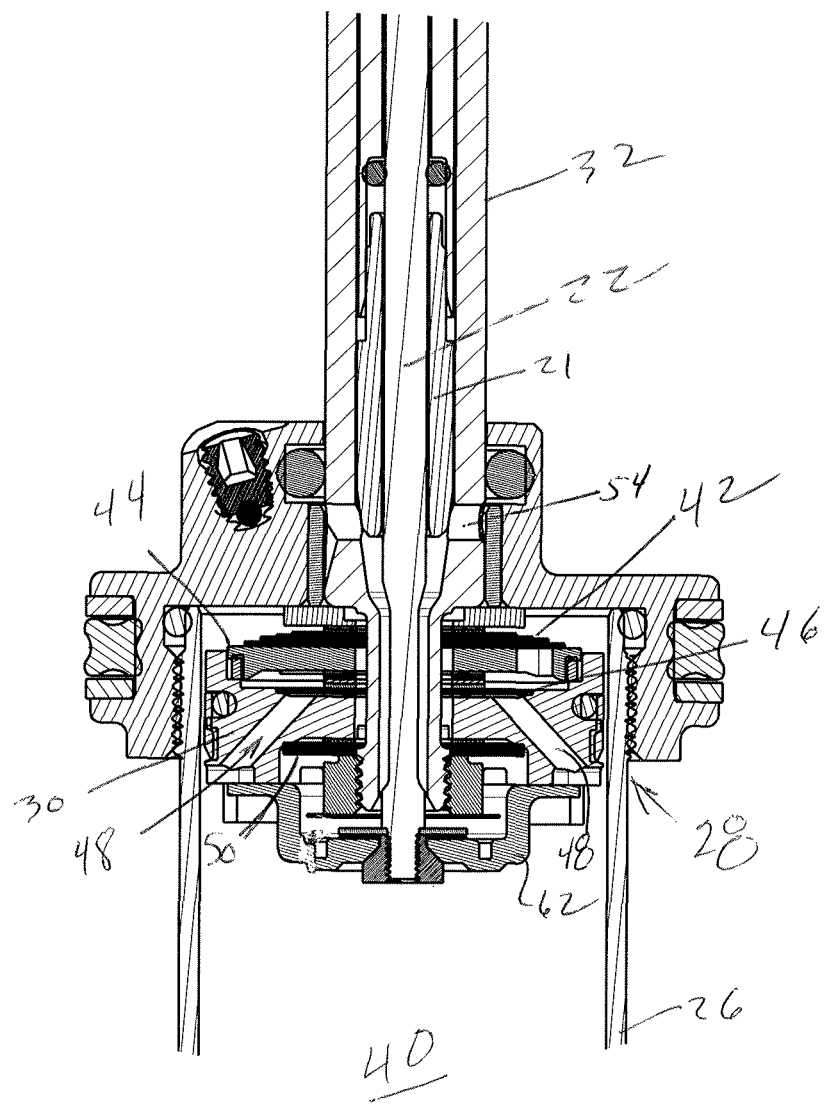
FIG. 11 is a cross-section of the piston assembly/valve assembly of the rear shock absorber.

The piston assembly 28 controls fluid flow between the first and second fluid chambers 38, 40. Referring to FIG. 11, the piston assembly 28 includes shims (i.e., flexible discs) associated with or disposed on the piston 30 to create damping force. It will be understood that the invention could be configured by one with ordinary skill, i.e., with respect to the specific positions, sizes and shapes of the various elements, to interact with a number of piston and valve arrangements. In FIG. 11, the system 10 is shown in a "lockout" state.

In the illustrated example, the piston assembly 28 includes a piston plate 44 located atop piston 30. A compression shim stack 42 is positioned atop the piston plate 44. A blow off shim stack 46 is located between the piston plate 44 and the main piston body 30 and operates on fluid passing through the main piston body. A rebound shim stack 50 is positioned below the main piston body 30.

Figure 13:
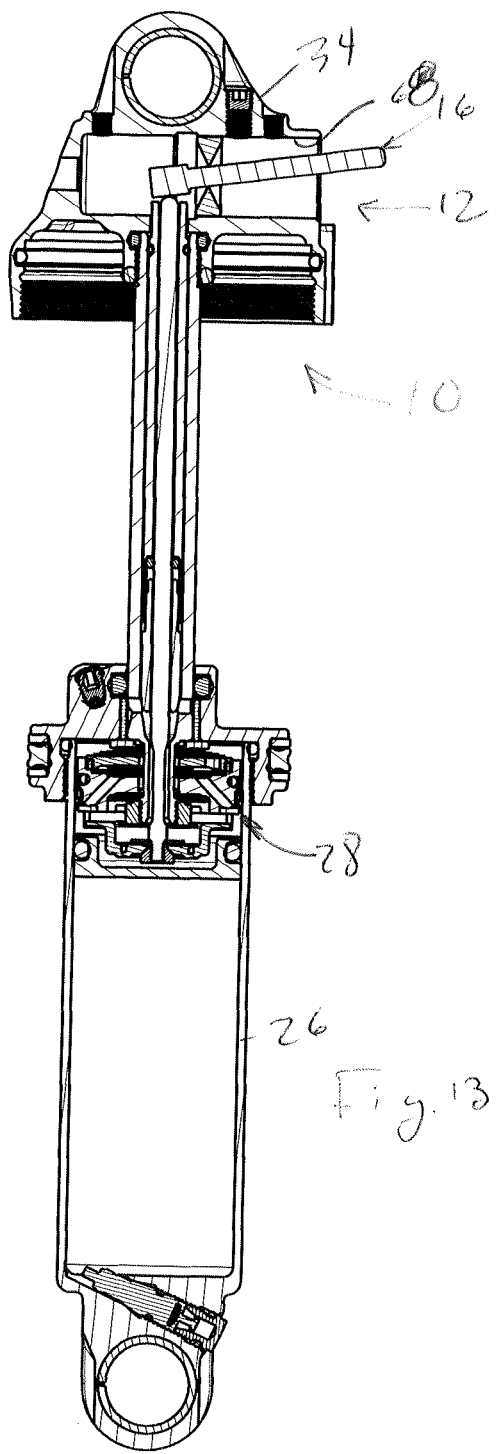
FIG. 13 is a cross section of a rear shock absorber with the control assembly including a first actuator.

The piston assembly 28 includes a top hat structure 62 located below the piston 30. When spaced from the piston 30, the top hat 62 provides for the passage of fluid through the piston assembly which fluid is modulated by the rebound shim stack 50. When the top structure 62 is as shown in FIG. 11, the system 10 is in a lockout state. FIG. 13 shows the top hat 62 spaced from the piston 30 permitting a maximum amount of fluid flow through the piston.

The lockout state is produced when the driver 22 permits the top hat 62 to be drawn against the piston 30 as shown in FIG. 11. The open state is produced when the top hat 62 is separated from the piston body 30 (FIG. 13) by the downward axial motion of the driver 22 (see FIG. 3) produced by the first actuator.

Rebound damping is modulated by the position of rod 21 within the main shaft 32. The axial position of the rod 21 meters fluid that flows through the main shaft passageways 54. As seen in FIG. 11, the main shaft fluid passageways 54 can be variably covered by the rod 21. Accordingly, a range of rebound damping conditions can be provided by the variable position of the rod 21.

As seen in FIGS. 2-7, the second actuator 18 may be provided with a stop pin 82 according to a known configuration that contacts the cylindrical body 76 to limit the movement thereof to a predetermined amount of angular rotation. Also, second actuator 18 may further include a detent mechanism 84 for holding the dial 74 in a particular angular position. The detent mechanism 84 may include a detent ball or rod 86 received in a cavity 88 of the distal end 34 of the first cylinder 24 and engageable with a plurality of detent notches 90 on the cylindrical body 76. A detent spring 92 biases the detent rod 86 against one of the detent notches 90.

Figure 12:
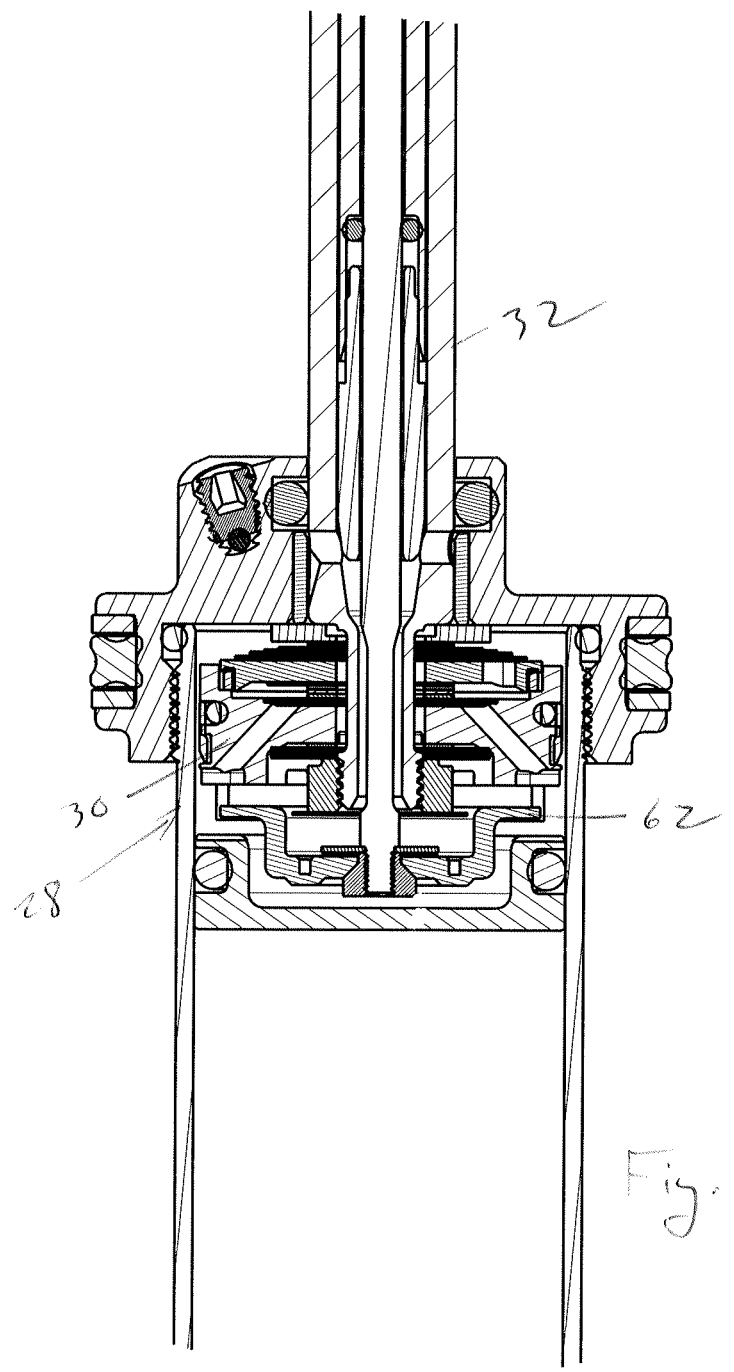
FIG. 12 is a cross-section of the piston assembly/valve assembly of the rear shock absorber with the top hat in an open state.

FIGS. 8-10 illustrate some alternative configurations of the fulcrum part 66. Specifically, the fulcrum part 66 may be circular, elliptical, ovoid, oblate spheroid, spheroidal, ball, spherical, or lobed, for example, as shown generally at 66A. Any one of the above spheroidal shapes can be truncated 66B, as shown in FIG. 9. Further, an eyelet fulcrum 66C, as illustrated in FIG. 10 and FIG. 12, could supply pivoting as above. The spheroid fulcrum parts 66A and B will be understood to pivot in place and the fulcrum part 66C will remain stationary in place. Either way, it will be understood that the control arm or lever part 64 of the first actuator 16 pivots on (or at) the fulcrum part 66.

Referring to FIG. 12, the suspension system 10 may have only one actuator. In the illustrated example, the control assembly 12 consists of a single actuator 16, which is disposed and supported within the bore 68 of the distal end 34. The bore 68 may be shaped and sized to define a seat to receive and retain the fulcrum body 66 with or without a sleeve 70 (FIG. 2) or the like.

While this invention has been described by reference to particular embodiments, it should be understood that numerous changes could be made within the spirit and scope of the inventive concepts described. Accordingly, it is intended that the invention not be limited to the disclosed embodiment, but that it have the full scope permitted by the language of the following claims.

The invention claimed is:

1. A control assembly for controlling a bicycle component, comprising:
    a first actuator carried by the component, the first actuator including a fulcrum body supported in the component and a control arm displacing the fulcrum body, the first actuator pivoting on the fulcrum body to operate a first rod to operatively control a first characteristic of the component; and
    a second actuator carried by the component and operatively connected to a second rod to control a second characteristic of the component, one of the first and second rods disposed within the other of the first and second rods.

2. The control assembly of claim 1, wherein the first actuator has an exterior portion that extends from the fulcrum body to a point outside of a housing of the component.

3. The control assembly of claim 2, wherein the component is a suspension component and wherein the first actuator has an interior portion that extends from the fulcrum body to the first rod, the first rod operative to control compression damping in the suspension component.

4. The control assembly of claim 3, wherein the interior portion as a lesser length than the exterior portion.

5. The control assembly of claim 1, wherein the first actuator controls compression damping.

6. The control assembly of claim 5, wherein the compression damping is switchable from a lockout to an open setting by the first actuator.

7. The control assembly of claim 5, wherein the compression damping is adjustable between a plurality of settings by the first actuator.

8. The control assembly of claim 5, wherein the second actuator controls rebound damping.

9. The control assembly of claim 1, wherein the component is a rear shock absorber.

10. The control assembly of claim 9, wherein the shock absorber includes a piston assembly and the first rod is moved axially to effect changes in fluid flow through the piston assembly.

11. The control assembly of claim 9, wherein the shock absorber has a housing defining a seat shaped and sized to retain the fulcrum body.

12. The control assembly of claim 1, wherein the fulcrum body is spheroidal or spherical.

13. The control assembly of claim 12, wherein the fulcrum body is a one-piece construction with the control arm.

14. The control assembly of claim 1, wherein the fulcrum body and the control arm are separate.

15. The control assembly of claim 14, wherein the fulcrum body is in the form of an eyelet.

16. The control assembly of claim 1, wherein the control arm is configured to move in a plane that passes through the axis of the shock absorber.

17. A control assembly for controlling a bicycle component, comprising:
a first actuator carried by the component, the first actuator including a fulcrum body supported in the component and a control arm displacing the fulcrum body, the first actuator pivoting on the fulcrum body to operatively control a first characteristic of the component; and
a second actuator displaceable in a housing of the component, the second actuator including a hollow interior shaped and sized to retain the fulcrum body of the first actuator, the second actuator operative to control a second characteristic of the component.

18. The control assembly of claim 17, wherein the first actuator has an exterior portion that extends from the fulcrum body to a driver, the driver operative to control compression damping in the component.

19. The control assembly of claim 18, wherein the first actuator has an interior portion that extends from the fulcrum body to a driver, the driver operative to control compression damping in the component.

20. The control assembly of claim 19, wherein the interior portion has a lesser length than the exterior portion.

21. The control assembly of claim 17, wherein the second actuator includes a cylindrical portion that defines the hollow interior.

22. The control assembly of claim 21, further including a sleeve that is sized and shaped to fit within the hollow interior to define a seat for the fulcrum body with the cylindrical portion.

23. The control assembly of claim 17, wherein the fulcrum body is spheroidal or spherical.

24. The control assembly of claim 23, wherein the fulcrum body is a one-piece construction with the control arm.

25. The control assembly of claim 17, wherein the fulcrum body and control arm are separate.

26. The control assembly of claim 25, wherein the fulcrum body is in the form of an eyelet.

27. The control assembly of claim 17, wherein the second actuator is configured to be rotatably displaceable.

28. The control assembly of claim 17, wherein the hollow interior is shaped to pivotally retain the second actuator.

29. The control assembly of claim 17, wherein the second actuator controls rebound damping.

* * * * *